United States Patent [19]

Lee

[11] Patent Number: 5,728,257
[45] Date of Patent: Mar. 17, 1998

[54] POUCH LAMINATOR

[76] Inventor: Seung-Hun Lee, #2-303 Samik Villa, 19-3 Pulkwang-1dong, Eunpyoung-ku, Seoul, Rep. of Korea

[21] Appl. No.: 646,989

[22] Filed: May 8, 1996

[51] Int. Cl.$^6$ .................................. B30B 15/34
[52] U.S. Cl. .................. 156/555; 156/582; 156/583.1; 100/327; 100/328; 219/244
[58] Field of Search .................. 156/555, 580, 156/581, 582, 583.1; 100/93 RP, 327, 328; 219/244, 520, 536, 537

[56] References Cited

U.S. PATENT DOCUMENTS

| | | | |
|---|---|---|---|
| 3,453,169 | 7/1969 | Buck et al. | 156/555 X |
| 3,901,758 | 8/1975 | Humphries | 156/499 |
| 4,416,719 | 11/1983 | Horiuchi | 156/359 |
| 4,451,320 | 5/1984 | Marvel | 156/366 |
| 5,133,828 | 7/1992 | Jacques | 156/555 |
| 5,368,677 | 11/1994 | Ueda et al. | 156/362 |
| 5,370,764 | 12/1994 | Alikhan | 156/553 |
| 5,540,806 | 7/1996 | Traise | 156/555 |

*Primary Examiner*—James Sells
*Attorney, Agent, or Firm*—Michael N. Meller

[57] ABSTRACT

A pouch laminator used for coating both sides of a small-sized sheet such as a photograph or identification card with a vinyl film is disclosed. Two folding guide plates are hinged to front and rear sides of the laminator body, respectively. A pair of bearing units are placed inside the laminator body for bearing the heating and molding rollers. A tension member detachably mounted to the top of each bearing unit for elastically holding the heating and molding rollers. A power supply unit having an elastic piece is placed aside each bearing unit. The elastic piece is brought into contact with a terminal provided on an associated end of each heating roller. A flat or embossing roller may be used as the molding roller. The embossing roller has a knurled rolling surface, thus embossing both sides of a coated sheet.

2 Claims, 4 Drawing Sheets

POUCH LAMINATOR

BACKGROUND OF THE INVENTION

1. Field of the Invention

The present invention relates in general to pouch laminators used for coating both sides of a small-sized sheet such as a photograph or identification card with a vinyl film and, more particularly, to a structural improvement in such laminators to provide heating and molding rollers suitable for easy installment or removal of the laminator body, thus simplifying manufacture and repair of the laminators. The above structural improvement also achieves the recent trend of compactness of the laminators thus allowing easy handling of the laminators, and allows a flat or embossing roller to be selectively used as the molding roller in the laminators.

2. Description of the Prior Art

As well known to those skilled in the art, laminators used for coating a sheet with a vinyl film have been generally classified into two types, that is, pouch and roll type laminators. Of the two, the pouch laminators have been typically used for coating a small-sized sheet such as a photograph or identification card.

As the pouch laminator (hereinbelow, referred to simply as "laminator") typically uses a high temperature film as its coating film, at least one heating roller installed in the laminator must be heated to a high temperature of not less than 150° C. However, in order to raise the temperature of the heating roller to a level high enough to smoothly perform the coating operation, the heating roller must be preheated for a lengthy period of time. The coating operation of the laminator is thus slowed, wasting electricity, thus increasing the managing cost of the laminator. The above laminator has a complicated structure for connecting the heating roller to a heat source, so the laminator is difficult to manage or clean, thus being inconvenient to users. The size of the above laminator is enlarged and causes difficulty in handling the laminator.

In the above laminator, the molding roller operating in conjunction with the heating roller is a flat roller having a flat rolling surface. Due to the flat molding roller, the laminator only provides a flat coated surface, thus failing to provide a high-grade and distinct coated sheet.

SUMMARY OF THE INVENTION

It is, therefore, an object of the present invention to provide a structurally improved pouch laminator in which the above problems can be overcome and which has an improved practicality by providing easy installment or removal of heating and molding rollers that are suitable to meet the recent trend of the use of low temperature film as the coating film, and improves the quality of coated surface by selectively using a flat or embossing roller as its molding roller, and achieves the recent trend of compactness without causing any problems in the use of the laminator by attaching two folding guide plates to the front and rear sides of the laminator body, thereby providing easy handling while manufacturing, transporting or installing the laminator.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
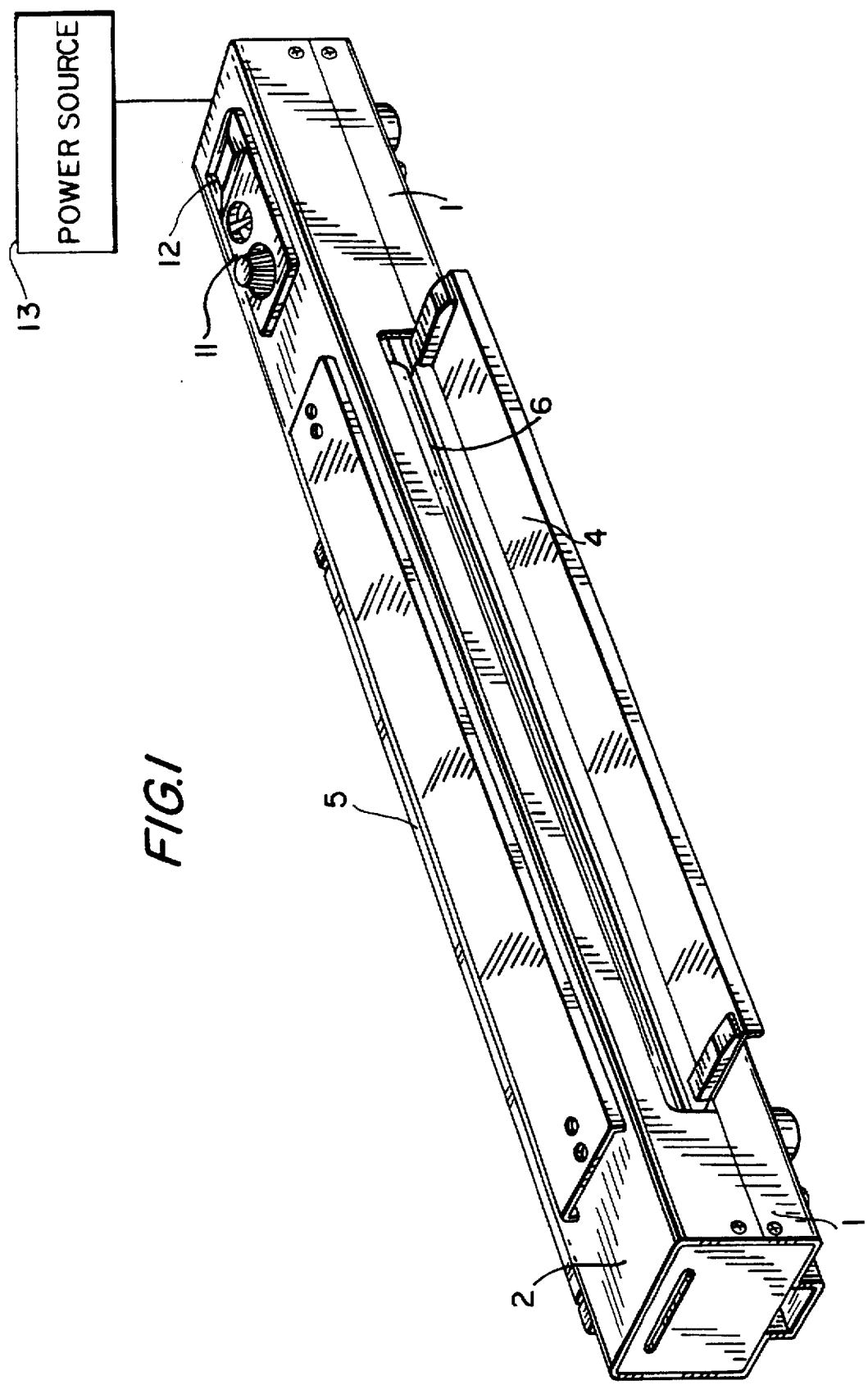
FIG. 1 is a perspective view of the pouch laminator according to a preferred embodiment of the present invention.

FIGS. 1 to 5 show the pouch laminator according to a preferred embodiment of the present invention. As shown in the drawings, the laminator body 1 is covered with a top cover 2 having a radiating window 3. Two folding guide plates 4 and 5 are hinged to the front and rear sides of the body 1, respectively. In the above body 1, a bearing unit 8 is placed in each side for bearing associated ends of two sets of rollers, that is, heating and molding rollers 6 and 7. Each set of rollers 6 or 7 comprises an upper and lower roller both of which extend horizontally inside the body 1 and are connected to a reversible drive motor M through a power transmission gear train G. A tension member 9 is detachably mounted to the top of each bearing unit 8 and elastically holds the heating and molding rollers 6 and 7 in cooperation with the bearing unit 8. Both ends of each heating roller 6 have terminals 6a. Each terminal 6a is brought into contact with an elastic piece 10a of a power supply unit 10. The power supply unit 10 in turn is connected to an external power source.

Figure 2:
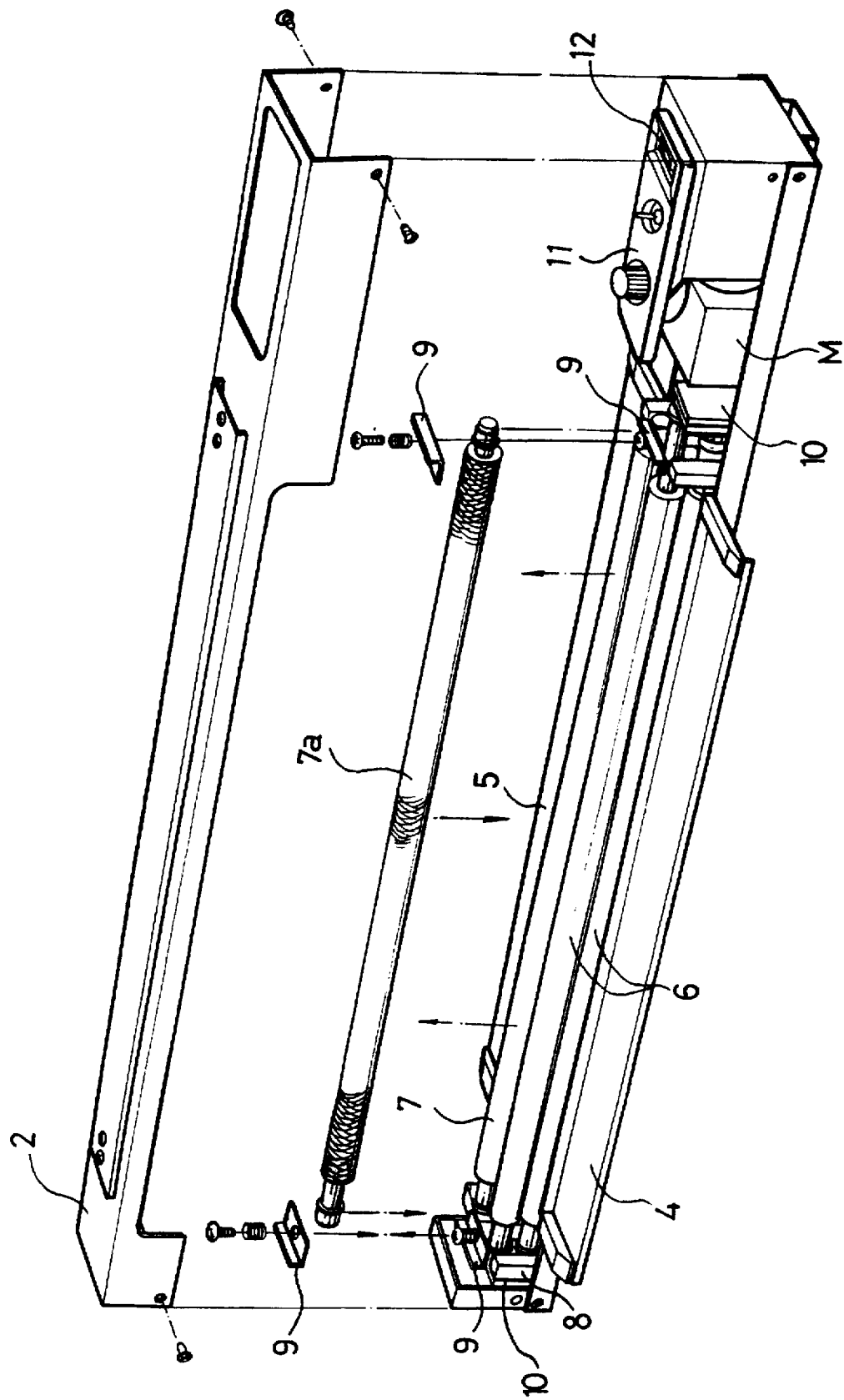
FIG. 2 is an exploded perspective view showing the construction of the above laminator.
Figure 3:
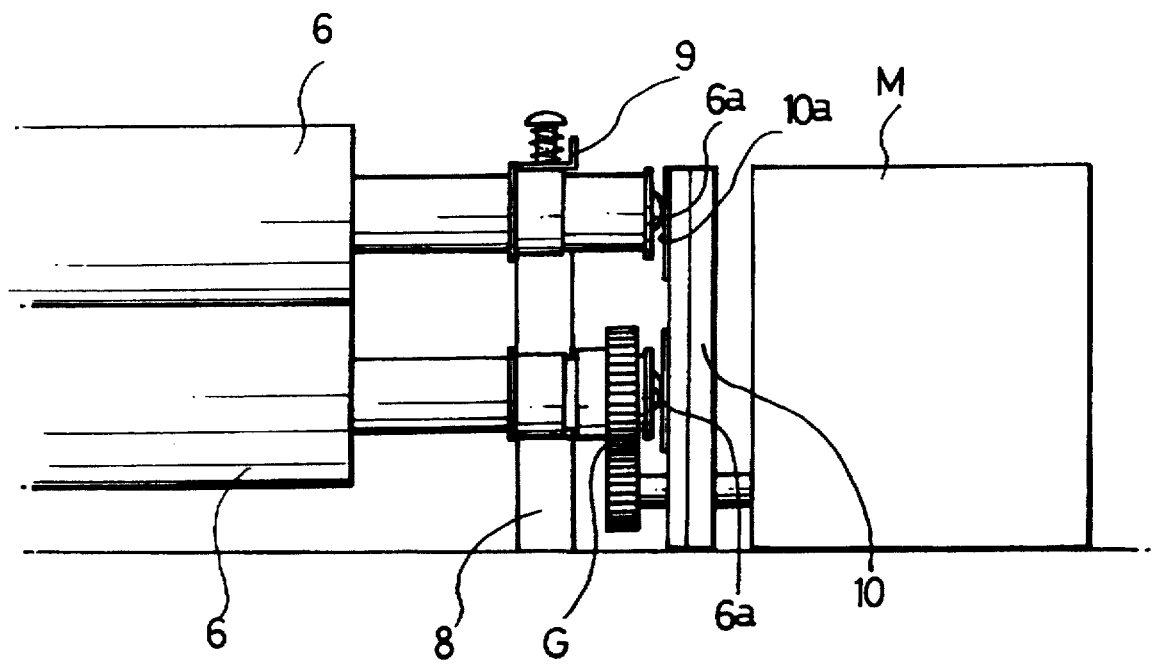
FIG. 3 is a partial front view of the above laminator, showing the construction of a power transmission gear train and electric power supplying means.
Figure 4:
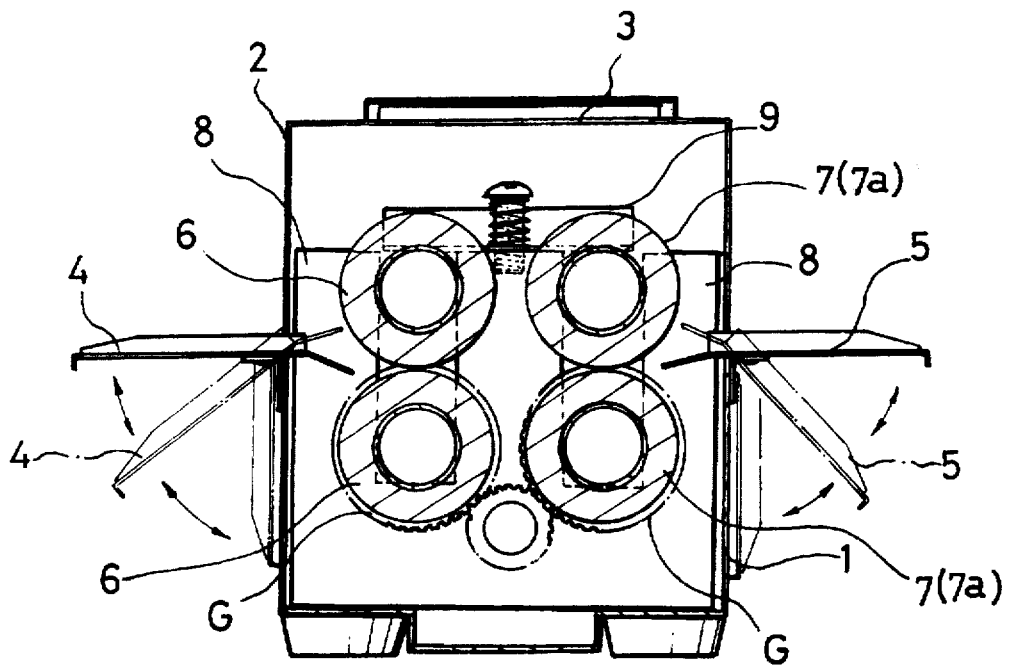
FIG. 4 is a side sectional view of the above laminator, showing the roller arrangement and the operation of front and rear folding guide plates.
Figure 5:
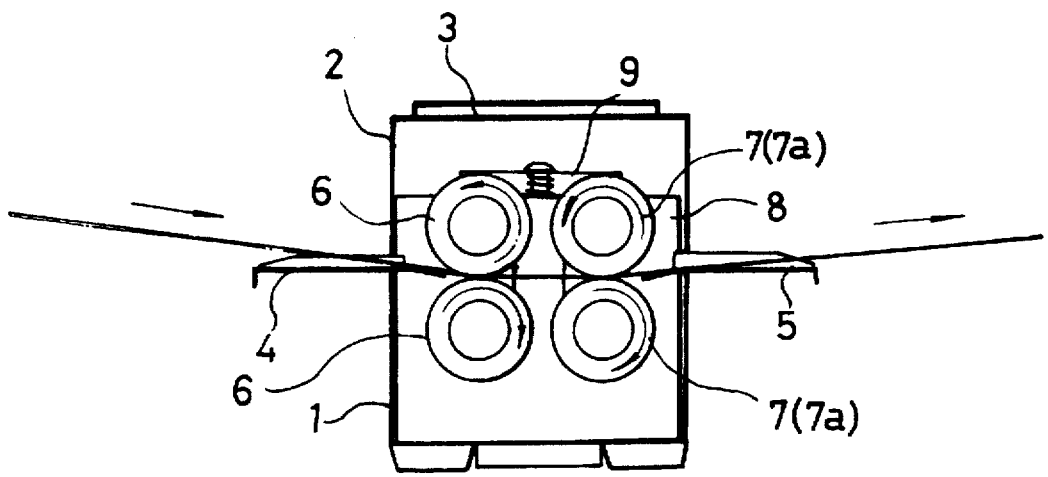
FIG. 5 is a side view showing the coating operation of the above laminator.

In the present invention, each molding roller 7 may be a flat roller having a flat rolling surface. Alternatively, each molding roller 7 may be an embossing roller 7a having a knurled rolling surface as shown in FIG. 2. That is, either a flat roller or an embossing roller 7a may be selectively used as the molding roller 7 in the above laminator.

In the drawings, the reference numeral 11 denotes a control unit of the above laminator.

The operational effect of the above laminator will be described hereinbelow.

When the laminator is not used, the guide plates 4 and 5 of the body 1 are fully folded to give a compact configuration to the laminator. In order to use the laminator for coating a sheet, the plates 4 and 5 are opened to their horizontal positions prior to operating the power switch 12 of the control unit 11. When the switch 12 is operated, the reversible drive motor M starts to rotate the heating and molding rollers 6 and 7. The electric power of an external power source 13 is thus applied to the elastic pieces 10a of the power supply units 10. Therefore, the hot wire or nichrome wire provided inside each heating roller 6 is turned on through the terminals 6a that are brought into contact with the above elastic pieces 10a. The hot wire thus heats the heating roller 6 to a predetermined temperature of about 110° C. in a short time. A sheet covered with pouch coating films on both sides is laid on the front guide plate 4 of the laminator body 1 in the above state and in turn is pushed into the nip between the upper and lower heating rollers 6. The sheet with the films thus passes through the heating rollers 6 to be heated prior to passing through the molding rollers 7. While the sheet passes through the molding rollers 7, the heated films are tightly compressed by the rollers 7 and tightly coated onto both sides of the sheet. The sheet coated with the films in turn comes out of the laminator and is exited out over the rear guide plate 5.

In order to use the embossing rollers 7a as the molding rollers 7 and thereby provide a unique and excellent coated surface on the coated sheet, the tension members 9 are separated from the bearing units 8 prior to removing the flat molding rollers 7 from the laminator body 1. After removing the flat molding rollers 7, the embossing rollers 7a having the knurled rolling surfaces are mounted to the bearing units 8 prior to mounting the tension members 9 to the bearing units 8. The embossing rollers 7a are thus elastically held by the tension members 9. When a sheet with pouch coating films on its both sides is subjected to the above-described coating operation, the knurled rolling surfaces of the embossing rollers 7a emboss both sides of the sheet with the films, thus providing an embossed surface on each side of the coated sheet.

The above embossed surface of the coated sheet is more unique than a flat surface. The above sheet also causes a diffused reflection on its embossed surfaces and prevents the coated surfaces from shining. In addition, the embossing rollers 7a compress the coating films onto both sides of the sheet more strongly in comparison with the typical flat rollers, thus improving the coating strength and providing a high-grade coated sheet.

As described above, the present invention provides a structurally improved pouch laminator. In the above laminator, front and rear folding guide plates are hinged to the front and rear sides of the laminator body, respectively, thus achieving the recent trend of compactness of the laminator without causing any problems in the use of the laminator. In accordance with the invention, a flat or embossing roller can be selectively used as the molding roller. When the embossing roller, having a knurled rolling surface, is substituted for the flat roller, the laminator gives embossed surfaces to the coated sheet.

The heating and molding rollers of the above laminator are rotatably supported by opposite bearing units and elastically held by tension members detachably mounted to the bearing units, respectively. The laminator is thus convenient to the user while exchanging or repairing the rollers and has an improved operational reliability. In addition, the hot wire installed in each heating roller is connected to an external power source through electric power connecting means. The above power connecting means comprises opposite terminals that are provided on both ends of each heating roller. The terminals rotate along with the heating roller and always come into contact with elastic pieces of power supply units arranged aside both ends of the heating roller. Due to the above electric power connecting means, the construction of the laminator is further simplified, reducing the cost of the laminator and allowing the parts of the laminator to be easily repaired or exchanged.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pouch laminator comprising upper and lower heating and molding rollers horizontally extending in a laminator body and connected to a reversible drive motor through a power transmission gear train, further comprising:

folding guide plates hinged to front and rear sides of said laminator body, respectively;

a bearing unit placed in each side of an interior of said laminator body and adapted for elastically bearing associated ends of the heating and molding rollers;

a tension member detachably mounted to a top of each bearing unit for elastically holding the heating and molding rollers; and a power supply unit connected to an external power source, said power supply unit having an elastic piece that is placed on each side of the bearing unit, said elastic piece being brought into electrical contact with a terminal (6a) provided on an associated end of the heating roller to supply power to the heating roller and maintain electrical contact and an electrical connection between the heating roller and the power supply unit as the heating roller rotates whereby the elasticity of the elastic piece and the elastic holding by the bearing unit maintains an electrical path from the power supply to the heating roller as the heating roller rotates.

2. The pouch laminator according to claim 1, wherein said molding roller is an embossing roller having a knurled rolling surface.

* * * * *